United States Patent
Tanaka et al.

(10) Patent No.: US 9,497,679 B2
(45) Date of Patent: Nov. 15, 2016

(54) MOBILE STATION AND MOBILE COMMUNICATION METHOD

(71) Applicant: NTT DOCOMO, INC., Tokyo (JP)

(72) Inventors: Itsuma Tanaka, Tokyo (JP); Aki Ohashi, Tokyo (JP);
(Continued)

(73) Assignee: NTT DOCOMO, INC., Tokyo (JP)

(*) Notice: Subject to any disclaimer, the term of this patent is extended or adjusted under 35 U.S.C. 154(b) by 0 days.

(21) Appl. No.: 14/426,564

(22) PCT Filed: Sep. 4, 2013

(86) PCT No.: PCT/JP2013/073822
§ 371 (c)(1),
(2) Date: Mar. 6, 2015

(87) PCT Pub. No.: WO2014/038598
PCT Pub. Date: Mar. 13, 2014

(65) Prior Publication Data
US 2015/0223130 A1    Aug. 6, 2015

(30) Foreign Application Priority Data

Sep. 7, 2012    (JP) .................. 2012-197019

(51) Int. Cl.
*H04W 36/14*    (2009.01)
*H04W 48/18*    (2009.01)
(Continued)

(52) U.S. Cl.
CPC ......... *H04W 36/14* (2013.01); *H04W 36/0022* (2013.01); *H04W 48/18* (2013.01); *H04W 68/12* (2013.01); *H04W 88/02* (2013.01)

(58) Field of Classification Search
None
See application file for complete search history.

(56) References Cited

U.S. PATENT DOCUMENTS 8,706,148 B2* 4/2014 Pudney .................. H04W 4/12
                                                455/466
8,942,707 B2* 1/2015 Zisimopoulos ....... H04W 36/14
                                                370/331
(Continued)

FOREIGN PATENT DOCUMENTS

EP    2482584 A1    8/2012

OTHER PUBLICATIONS

International Search Report issued in PCT/JP2013/073822 mailed on Oct. 8, 2013 (1 page).
(Continued)

*Primary Examiner* — Ayaz Sheikh
*Assistant Examiner* — Faiyazkhan Ghafoerkhan
(74) *Attorney, Agent, or Firm* — Osha Liang LLP

(57) ABSTRACT

A mobile station and a mobile communication method are provided, which are capable of continuing output of an announcement sound even if a transition is made from LTE to 3G by SRVCC when the announcement sound is being received from a network side in response to a call request to a call-terminating terminal. A UE 100A executes continuation processing (SRVCC) of a 3G voice communication service if the mobile station makes a transition of a connection destination from LTE to 3G. Further, the UE 100A receives the announcement sound via LTE or 3G, and outputs the announcement sound after requesting alerting of the other party and before starting the alerting of the other party. The UE 100A outputs the announcement sound even after making a transition to 3G if the continuation processing of the voice communication service is executed during a period when the announcement sound is being outputted.

3 Claims, 5 Drawing Sheets

(72) Inventors: Hiromi Himeno, Tokyo (JP); Hideyuki Sakuramoto, Tokyo (JP)

(51) Int. Cl.
    *H04W 68/12*     (2009.01)
    *H04W 88/02*     (2009.01)
    *H04W 36/00*     (2009.01)

(56) References Cited

U.S. PATENT DOCUMENTS

| | | | | |
|---|---|---|---|---|
| 9,100,877 | B2* | 8/2015 | Parron | H04W 36/0022 |
| 2009/0190573 | A1* | 7/2009 | Siegel | H04L 65/1016 |
| | | | | 370/352 |
| 2009/0191867 | A1* | 7/2009 | Siegel | H04L 65/1016 |
| | | | | 455/435.1 |
| 2009/0191868 | A1* | 7/2009 | Siegel | H04L 65/1016 |
| | | | | 455/435.1 |
| 2009/0191869 | A1* | 7/2009 | Siegel | H04W 8/02 |
| | | | | 455/435.1 |
| 2011/0014919 | A1* | 1/2011 | Otte | H04W 36/0061 |
| | | | | 455/442 |
| 2011/0021216 | A1* | 1/2011 | Pudney | H04W 4/12 |
| | | | | 455/466 |
| 2011/0069618 | A1* | 3/2011 | Wong | H04W 76/022 |
| | | | | 370/244 |
| 2013/0143565 | A1* | 6/2013 | Zisimopoulos | H04W 36/14 |
| | | | | 455/436 |
| 2013/0242942 | A1* | 9/2013 | Stille | H04L 65/1016 |
| | | | | 370/331 |
| 2013/0272194 | A1* | 10/2013 | Keller | H04W 36/0022 |
| | | | | 370/328 |
| 2013/0336127 | A1* | 12/2013 | Wu | H04W 24/08 |
| | | | | 370/241 |
| 2014/0176660 | A1* | 6/2014 | Khay-Ibbat | H04W 36/30 |
| | | | | 348/14.02 |
| 2014/0219241 | A1* | 8/2014 | Parron | H04W 36/0022 |
| | | | | 370/331 |
| 2015/0131614 | A1* | 5/2015 | Gao | H04W 36/0022 |
| | | | | 370/331 |

OTHER PUBLICATIONS

Written Opinion of the International Searching Authority issued in PCT/JP2013/073822 mailed on Oct. 8, 2013 (3 pages).

3GPP TS 23.237 V12.0.0; "3rd Generation Partnership Project; Technical Specification Group Services and System Aspects; IP Multimedia Subsystem (IMS) Service Continuity; Stage 2 (Release 12)"; Jun. 2012 (165 pages).

NTT Docomo; "SRVCC before ringing (brSRVCC)"; 3GPP SA WG2 Meeting #93, S2-124078; Sofia, Bulgaria; Oct. 8-12, 2012 (10 pages).

3GPP TS 24.628 V11.0.0; "3rd Generation Partnership Project; Technical Specification Group Core Network and Terminals: Common Basic Communication procedures using IP Multimedia (IM) Core Network (CN) subsystem: Protocol specification (Release 11)"; Sep. 2011 (57 pages).

3GPP TS 24.237 V11.3.0; "3rd Generation Partnership Project; Technical Specification Group Core Network and Terminals; IP Multimedia (IM) Core Network (CN) subsystem IP Multimedia Subsystem (IMS) Service Continuity: Stage 3 (Release 11)"; Jun. 2012 (341 pages).

3GPP TS 24.008 V11.3.0; "3rd Generation Partnership Project; Technical Specification Group Core Network and Terminals; Mobile radio interface Layer 3 specification; Core network protocols; Stage 3 (Release 11)"; Jun. 2012 (670 pages).

Extended European Search Report issued in corresponding European Application No. 13834945.1, mailed on May 2, 2016 (8 pages).

G. Camarillo et al.; "Early Media and Ringing Tone Generation in the Session Initiation Protocol (SIP)"; Network Norking Group, RFC 3960; Dec. 2004 (13 pages).

NTT Docomo; "eSRVCC before ringing (brSRVCC)"; SA WG2 Meeting #93, S2-123816; Sofia, Bulgaria; Oct. 8-12, 2012 (2 pages).

\* cited by examiner

US 9,497,679 B2

MOBILE STATION AND MOBILE COMMUNICATION METHOD

TECHNICAL FIELD

The present invention relates to a mobile station and a mobile communication method for executing a transition from a first radio access system with no circuit-switched domain to a second radio access system with a circuit-switched domain. More particularly, the present invention relates to a mobile station and a mobile communication method for outputting an announcement sound based on the announcement sound transmitted from a network side.

BACKGROUND ART

In technical standard specifications of a mobile communication system specified by 3rd Generation Partnership Project (3GPP), a method is specified to output an announcement sound based on the announcement sound transmitted from a network side after a call request is sent, more specifically, INVITE according to Session Initiation Protocol (SIP) is sent from a call-originating terminal to a call-terminating terminal and before "180 Ringing" is sent from the call-terminating terminal to the call-originating terminal (for example, Non-patent document 1). Examples of such announcement include announcing that the call is forwarded to a voice mail service from the call-terminating terminal, announcing that the call-terminating terminal is roaming abroad, and the like.

Moreover, in the 3GPP technical standard specifications, SRVCC (single Radio Voice Call Continuity) is specified, which allows a mobile station executing voice communication via Long Term Evolution (LTE) with no circuit-switched domain to make a transition to a 3G (W-CDMA) circuit-switched domain while continuing the voice communication (e.g., Non-patent document 2). As a type of the SRVCC, aSRVCC (SRVCC in alerting phase) is also specified, which enables a transition from LTE to 3G during alerting of the call-terminating terminal. The aSRVCC realizes the transition from LTE to 3G while maintaining the alerting even during the alerting of the call-terminating terminal.

PRIOR ART DOCUMENT

Non-Patent Document

Non-patent document 1: 3GPP TS 24.628 V11.0.0 Sub-clause 4.2 Announcement, 3rd Generation Partnership Project; Technical Specification Group Core Network and Terminals; Common Basic Communication procedures using IP Multimedia (IM) Core Network (CN) subsystem; Protocol specification (Release 11), 3GPP, September 2011

Non-patent document 2: 3GPP TS 24.237 V11.3.0 Sub-clause 12 "Roles for PS-CS session continuity, Single Radio", 3rd Generation Partnership Project; Technical Specification Group Core Network and Terminals; IP Multimedia (IM) Core Network (CN) subsystem IP Multimedia Subsystem (IMS) Service Continuity; Stage 3 (Release 11), 3GPP, June 2012

SUMMARY OF THE INVENTION

However, the conventional announcement and aSRVCC described above have the following problem. Specifically, aSRVCC provides a function to make a transition from LTE to 3G while continuing the voice communication during a period when "180 Ringing" is being transmitted from the call-terminating terminal to the call-originating terminal. There is a problem that the announcement sound is disrupted instead of being continued and falls off into silence even if a transition is made from LTE to 3G by SRVCC in a state where an announcement sound is being outputted, i.e., at a time after INVITE is transmitted and before "180 Ringing" is transmitted from the call-terminating terminal to the call-originating terminal. There is a concern that such disruption of the announcement sound may give a user a sense of discomfort.

Therefore, the present invention was made in consideration of the foregoing circumstances. It is an objective of the present invention to provide a mobile station and a mobile communication method capable of continuing output of an announcement sound even if a transition is made from LTE to 3G by SRVCC when the announcement sound is being received from a network side in response to a call request to a call-terminating terminal.

A first feature of the present invention is summarized as a mobile station capable of providing a voice communication service via an IP multimedia subsystem and configured to execute a transition from a first radio access system with no circuit-switched domain to a second radio access system with a circuit-switched domain, including: a voice communication control unit configured to execute continuation processing of the voice communication service in the second radio access system if the mobile station makes a transition of a connection destination from the first radio access system to the second radio access system; and an announcement control unit configured to receive an announcement sound via the first radio access system or the second radio access system, and output the announcement sound after requesting alerting of the other party and before starting the alerting of the other party. Here, the announcement control unit outputs the announcement sound even after a transition to the second radio access system is made if the voice communication control unit executes the continuation processing of the voice communication service during a period when the announcement sound is being outputted.

A second feature of the present invention is summarized as a mobile communication method for executing a transition of a mobile station from a first radio access system with no circuit-switched domain to a second radio access system with a circuit-switched domain, the method being capable of providing a voice communication service via an IP multimedia subsystem, including the steps of: executing continuation processing of the voice communication service in the second radio access system if the mobile station makes a transition of a connection destination from the first radio access system to the second radio access system; and receiving an announcement sound via the first radio access system or the second radio access system, and outputting the announcement sound after requesting alerting of the other party and before starting the alerting of the other party. Here, the announcement sound outputting step includes outputting the announcement sound even after a transition to the second radio access system is made if the continuation processing of the voice communication service is executed during a period when the announcement sound is being outputted.

DETAILED DESCRIPTION

Next, an embodiment of the present invention will be described. Note that, in the following description of the drawings, same or similar reference signs denote same or similar elements and portions. In addition, it should be noted that the drawings are schematic and ratios of dimensions and the like are different from actual ones.

Therefore, specific dimensions and the like should be determined in consideration of the following description. Moreover, the drawings also include portions having different dimensional relationships and ratios from each other.

(1) Overall Schematic Configuration of Mobile Communication System

Figure 1:
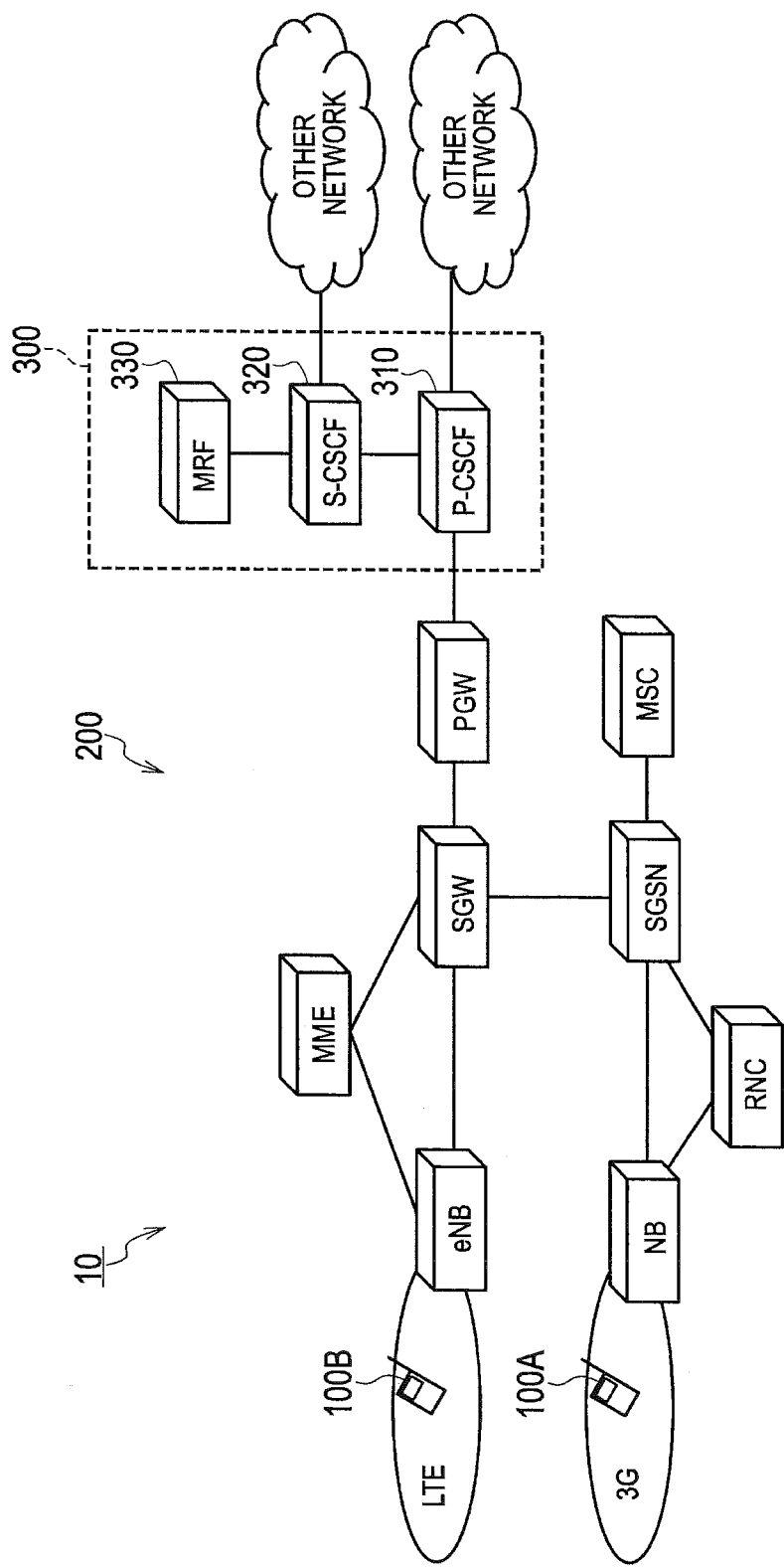
FIG. 1 is an overall schematic configuration diagram of a mobile communication system 10 according to an embodiment of the present invention.

FIG. 1 is an overall schematic configuration diagram of a mobile communication system 10 according to this embodiment. As shown in FIG. 1, the mobile communication system 10 includes mobile stations 100A and 100E (hereinafter the UEs 100A and 100B), an IP-Connectivity Access Network 200 (hereinafter the IP-CAN 200) and an IP Multimedia core network Subsystem 300 (hereinafter the IMS 300). In this embodiment, the UE 100A can execute radio communication according to Long Term Evolution (LTE) and 3G (W-CDMA). The UEs 100A and 100B can connect to the IP-CAN 200 according to LTE or 3G. Also, the UEs 100A and 100B can provide a voice communication service via the IMS 300 (IP multimedia subsystem), and can execute a transition from LTE (first radio access system) with no circuit-switched domain to 3G (second radio access system) with a circuit-switched domain.

The IP-CAN 200 is an access network according to an Internet protocol (IP). To be more specific, the IP-CAN 200 is a network that provides a transport function of a Session Initiation Protocol (SIP) and voice media, and corresponds to an LTE/Evolved Packet Core (EPC) network in this embodiment.

The IP-CAN 200 includes a Mobility Management Entity (MME), a Serving Gateway (SGW), a Packet Data Network Gateway (PGW) and an SGSN (Serving GPRS Support Node).

The MME is an exchange that accommodates an eNB (LTE radio base station) and provides functions of mobility control, bearer control, and the like. The SGW is a visited packet exchange which accommodates a 3GPP (LTE) access system. The PGW is a connection point with the IMS base, and is a packet exchange that performs IP address assignment, packet transfer to the SGW, and the like. Also, the PGW works with a PCRF to execute QoS control, bearer setting control, and the like. The SGSN is a packet exchange which accommodates a UTRAN (3G) access system. An MSC is an exchange for a voice communication call in 3G. An RNC controls an NB (3G radio base station).

The IMS 300 is a multimedia subsystem according to an Internet protocol, and includes a Proxy-Call Session Control Function 310 (hereinafter the P-CSCF 310), a Serving-Call Session Control Function (hereinafter the S-CSCF 320) and a Multimedia Resource Function (hereinafter the MRF 330).

The P-CSCF and the S-CSCF are SIP relay servers to execute SIP transfer, and the like. Moreover, other networks (such as a fixed telephone network) are connected to the IMS 300.

(2) Functional Block Configuration of Mobile Station

Figure 2:
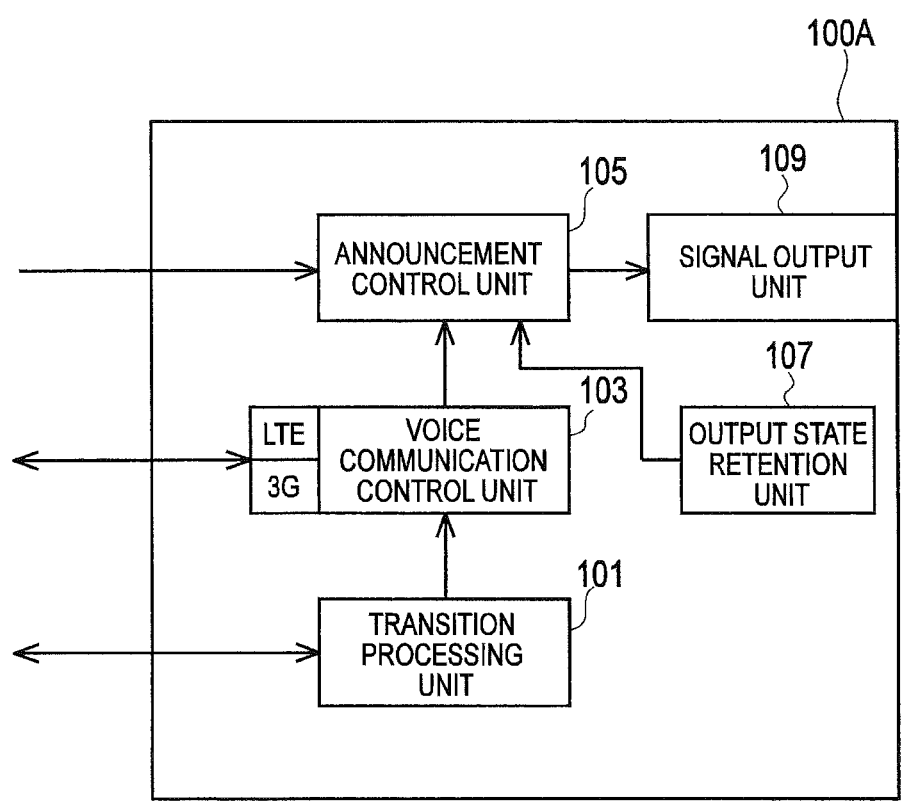
FIG. 2 is a functional block configuration diagram of a UE 100A according to the embodiment of the present invention.

FIG. 2 is a functional block configuration diagram of the UE 100A. As shown in FIG. 2, the UE 100A includes a transition processing unit 101, a voice communication control unit 103, an announcement control unit 105, an output state retention unit 107, and a signal output unit 109. Note that the UE 100B also has the same functional block configuration as that of the UE 100A.

The transition processing unit 101 executes processing on a transition of the UE 100A from LTE to 3G or from 3G to LTE. To be more specific, the transition processing unit 101 executes processing on a transition (such as HANDOVER and REDIRECTION) between LTE and 3G according to a state of a radio signal to be received by the UE 100A, and the like.

The voice communication control unit 103 executes control of voice communication to be provided by the UE 100A. To be more specific, the voice communication control unit 103 provides SRVCC (Single Radio Voice Call Continuity) to allow the UE 100A executing voice communication via LTE to make a transition to a 3G circuit-switched domain while continuing the voice communication, based on the decision on the transition by the transition processing unit 101. Moreover, as described later, the transition processing unit 101 and the voice communication control unit 103 provide functions of AS, 3G and LTE (see FIG. 4).

Particularly, in this embodiment, SRVCC is provided to execute continuation processing of a 3G voice communication service (e.g., a voice call) if the connection destination of the UE 100A makes a transition from LTE to 3G.

To be more specific, the voice communication control unit 103 causes the UE 100A to make a transition to 3G before the UE 100B is alerted (in a state where no SIP "180 Ringing" or "200 OK" is received) after a call request to the UE 100B (SIP INVITE) is transmitted to the IMS 300 and in a state where an announcement sound received from a network is being outputted. Note that the voice communication control unit 103 is different from aSRVCC to cause the UE 100A having no calls connected yet (specifically, having received no "200 OK") to make a transition to 3G in causing the UE 100A to make a transition to 3G in a state where no SIP "180 Ringing" or "200 OK" is received.

The announcement control unit 105 controls an announcement sound to be outputted from the signal output unit 109. In this embodiment, the announcement control unit 105 receives the announcement sound via LTE or 3G. Also, the announcement control unit 105 outputs the announcement sound after requesting alerting of the other party (e.g., the UE 100B) (after transmitting SIP INVITE) and before starting the alerting of the other party (before receiving "180 Ringing").

To be more specific, when the voice communication control unit 103 executes continuation processing of the voice communication service, the announcement control unit 105 outputs the announcement sound based on the output state retained by the output state retention unit 107. Examples of announcement to be outputted by the announcement control unit 105 include announcing forwarding to a voice mail service from the call-terminating terminal, announcing that the call-terminating terminal is roaming abroad, and the like.

The announcement control unit 105 outputs an announcement sound to be transmitted from a network (IMS 300), specifically, an announcement sound based on Early Media (specified by IETF RFC 3960) voice data. If the voice communication control unit 103 executes the continuation processing of the voice communication service, the announcement control unit 105 changes the state of the UE 100A in a CC (Call Control) block to "U3 Mobile Originating Call Proceeding" state, and establishes a path via 3G to receive the announcement sound. More specifically, as specified in 3GPP TS24.008 Subclause 5.2.4.3 and 5.5.1, User connection attach is executed in a call delivered state. Such processing enables in-band tones/announcement to be received via 3G.

The output state retention unit 107 retains the output state indicating whether or not the announcement sound is outputted. To be more specific, the output state retention unit 107 stores the output of the announcement sound after transmission of a call request to the call-terminating terminal via LTE, and notifies the announcement control unit 105 of the output state.

The signal output unit 109 outputs a ringing tone signal based on the control by the announcement control unit 105. To be more specific, the signal output unit 109 can be configured using a speaker to output a signal in an audible frequency range or a terminal and an interface (Bluetooth (registered trademark)) to output an analog or digital signal of the ringing tone.

(3) Operations of Mobile Communication System

Next, description is given of operations of the mobile communication system 10 described above. More specifically, description is given of a call sequence accompanied by reception of an announcement sound, a transition sequence from LTE to 3G by SRVCC, and an operation flow of the mobile stations (UEs 100A and 100B).

(3.1) Call Sequence Accompanied by Reception of Announcement Sound

Figure 3:
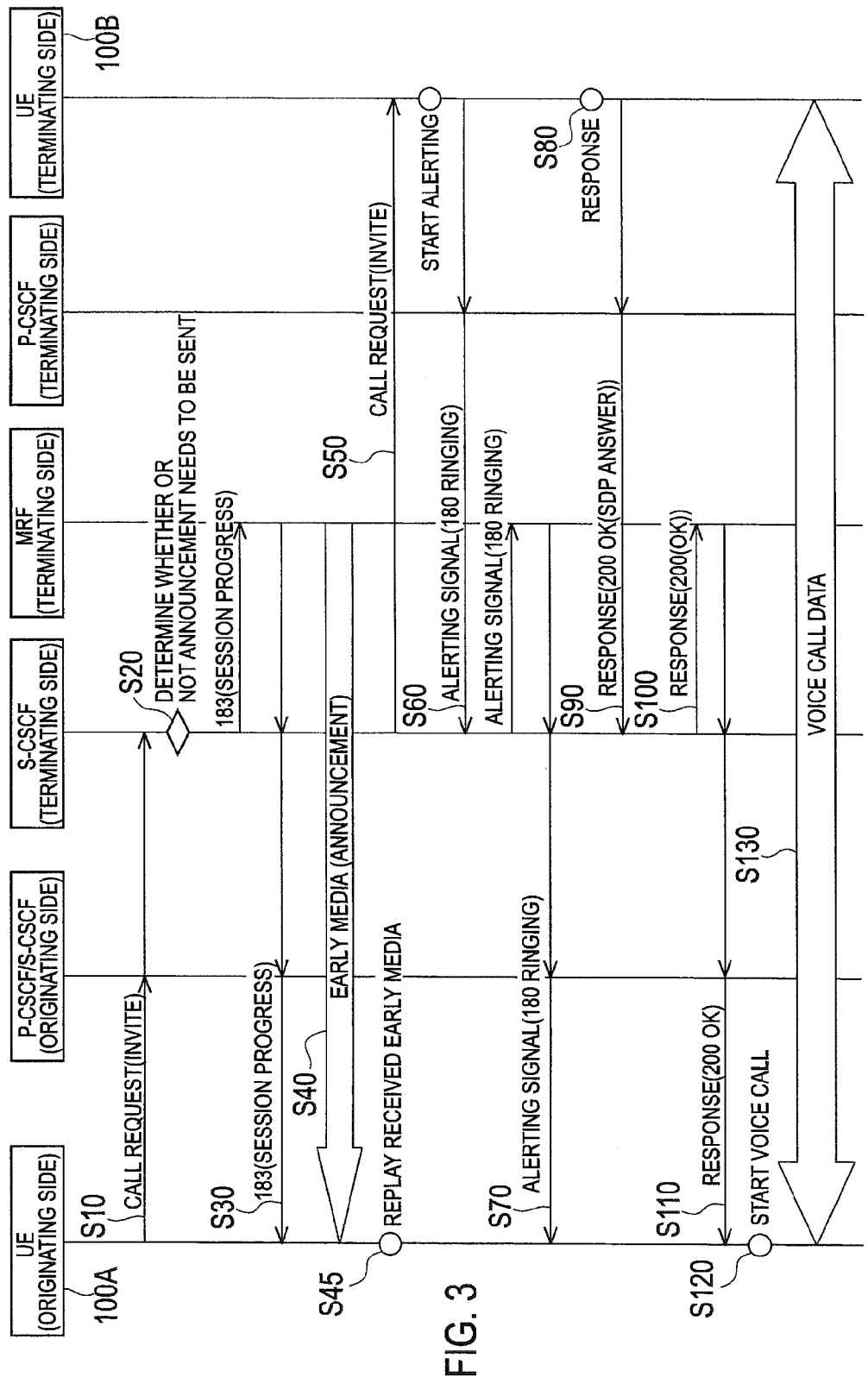
FIG. 3 is a sequence diagram schematically showing call origination accompanied by reception of an announcement sound according to the embodiment of the present invention.

FIG. 3 shows a schematic call sequence accompanied by reception of an announcement sound. Note that the sequence shown in FIG. 3 is a general call sequence accompanied by conventional reception of an announcement sound.

As shown in FIG. 3, the UE 100A (originating side) transmits a call request (specifically, SIP INVITE), and the call request is relayed to the S-CSCF 320 (terminating side) (S10). The S-CSCF 320 determines whether or not announcement needs to be sent to the UE 100A based on the call request (S20). To be more specific, the S-CSCF 320 determines whether or not announcement needs to be sent, the announcement announcing forwarding to a voice mail service from the UE 100B that is the call-terminating terminal, announcing that the call-terminating terminal is roaming abroad, or the like.

Based on a SIP message (183 Session Progress) received from the S-CSCF 320, the MRF 330 transmits the SIP message to the UE 100A (S30). Also, the MRF 330 transmits an announcement sound, specifically, Early Media voice data to the UE 100A (S40). The UE 100A replays the received Early Media to output the announcement sound (S45).

Also, the S-CSCF 320 relays the call request received from the UE 100A to the UE 100B (S50). Once the call request is relayed to the UE 100B, alerting of the UE 100B is started, and an alerting signal (180 Ringing) is relayed from the UE 100B to the S-CSCF 320 (terminating side) (S60). The S-CSCF 320 transmits the alerting signal to the UE 100A through the MRF 330 (S70).

Upon responding to the call, the UE 100B transmits a message (200 OK (SDP Answer)) indicating such a response to the S-CSCF 320 (S80 and S90). The response (200 OK) is relayed to the MRF 330 (S100). Then, the MRF 330 transmits the response (200 OK) to the UE 100A through the S-CSCF 320 (S110).

The UE 100A starts a voice communication service (voice call) based on the received response (200 OK), and thus voice call data is transmitted and received between the UE 100A and the UE 100B (S120 and S130).

(2) Transition Sequence from LTE to 3G by SRVCC

Figure 4:
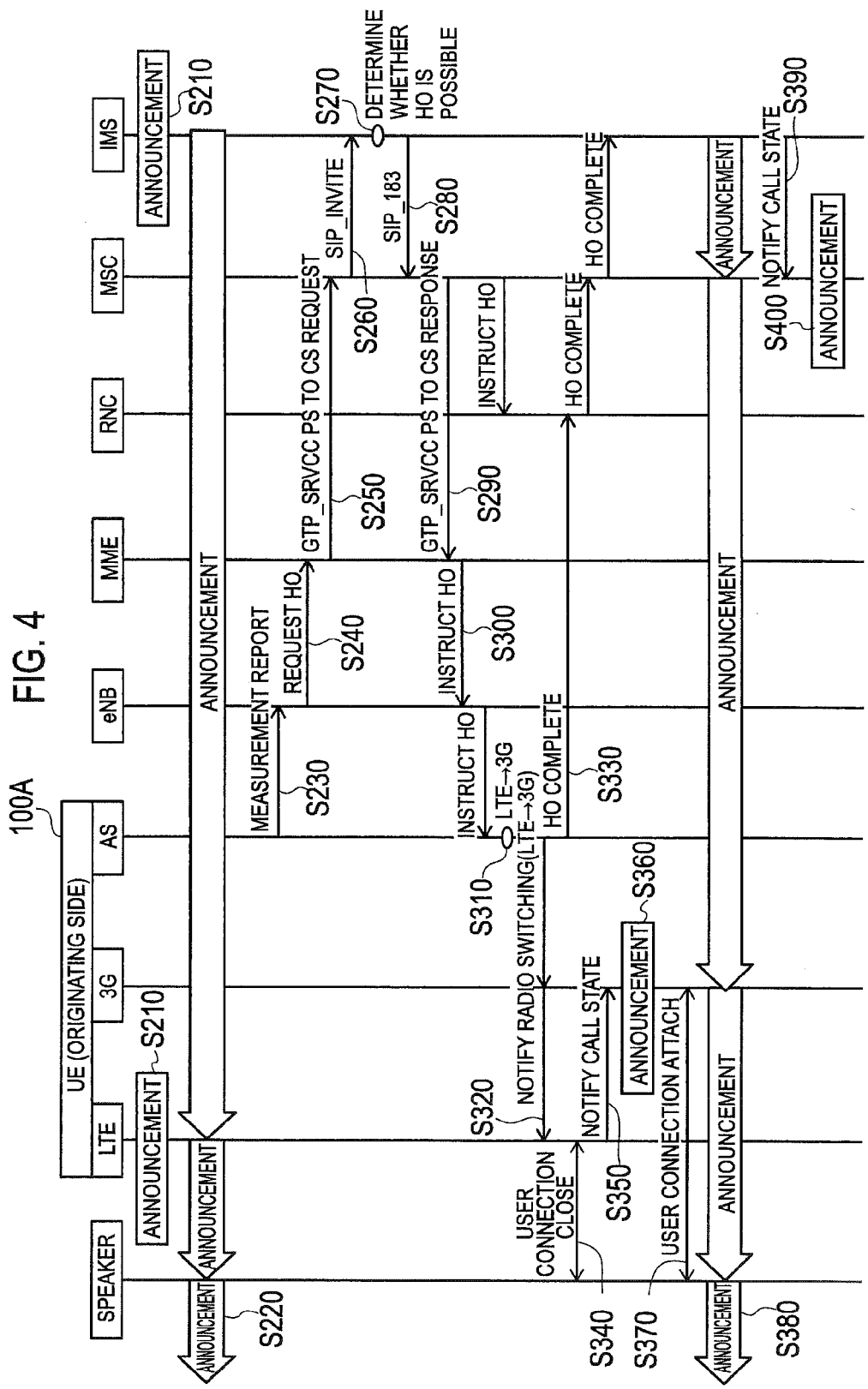
FIG. 4 is a sequence diagram showing communication based on a call-originating terminal (mobile station) in the case of a transition from LTE to 3G by SRVCC according to the embodiment of the present invention.

FIG. 4 shows a sequence diagram showing communication based on a call-originating terminal (mobile station) in the case of a transition from LTE to 3G by SRVCC. To be more specific, FIG. 4 shows the communication sequence when making a transition of the UE 100A to 3G before alerting the UE 100B (in a state where no SIP "180 Ringing" or "200 OK" is received) after transmitting a UE 100B call request (SIP INVITE) to the IMS 300 and in a state where an announcement sound is being outputted from the network.

As shown in FIG. 4, the UE 100A (originating side) includes AS (Access Stratum), 3G and LTE functional blocks. After transmitting a call request via LTE to the call-terminating terminal (UE 100B), the UE 100A receives the announcement sound from the network (S210). Also in the IMS 300, the state of the UE 100A is recognized as a state of receiving the announcement sound (S210). The UE 100A receives the announcement sound from the IMS 300 (specifically, the MRF 330) and outputs the received announcement sound (S220).

When the AS block transmits Measurement report to the eNB in the state where the UE 100A is outputting the announcement sound, the eNB requests the MME for handover (HO) from LTE to 3G based on the content of Measurement report (S230 and S240). Upon request of the eNB, the MME requests for a transition to 3G by SRVCC (GTP_SRVCC PS to CS Request) (S250), and the handover processing is executed among the RNC, MSC and IMS 300 (S260 to S280). Thereafter, the MME receives a response concerning the result of the processing (GTP_SRVCC PS to CS Response) from the MSC, and instructs the eNB to perform handover (S290 and S300).

The AS block in the UE 100A determines to execute switching from LTE to 3G based on the handover instruction from the eNB, and then notifies the LTE in the UE 100A of radio switching (S310 and S320). The AS in the UE 100A also notifies the network of the completion of the handover (HO Complete) (S330).

The LTE block in the UE 100A notified of the switching terminates the User connection established with the speaker (the signal output unit 109), and notifies the 3G block in the UE 100A of a call state (S340 and S350). Here, the "call state" notified from the LTE block to the 3G block in the UE 100A also includes the output state of the announcement sound.

The 3G block in the UE 100A establishes User connection with the speaker to continue the output of the announcement sound based on the notified call state (S360 and S370). The UE 100A receives the announcement sound from the network (IMS 300) and outputs the received announcement sound (S380). Then, the call state of the UE 100A is similarly notified from the IMS 300 to the MSC, and the state of the UE 100A is recognized as the state of receiving the announcement sound also in the MSC (S400).

(3.3) Operation Flow of Mobile Station

Figure 5:
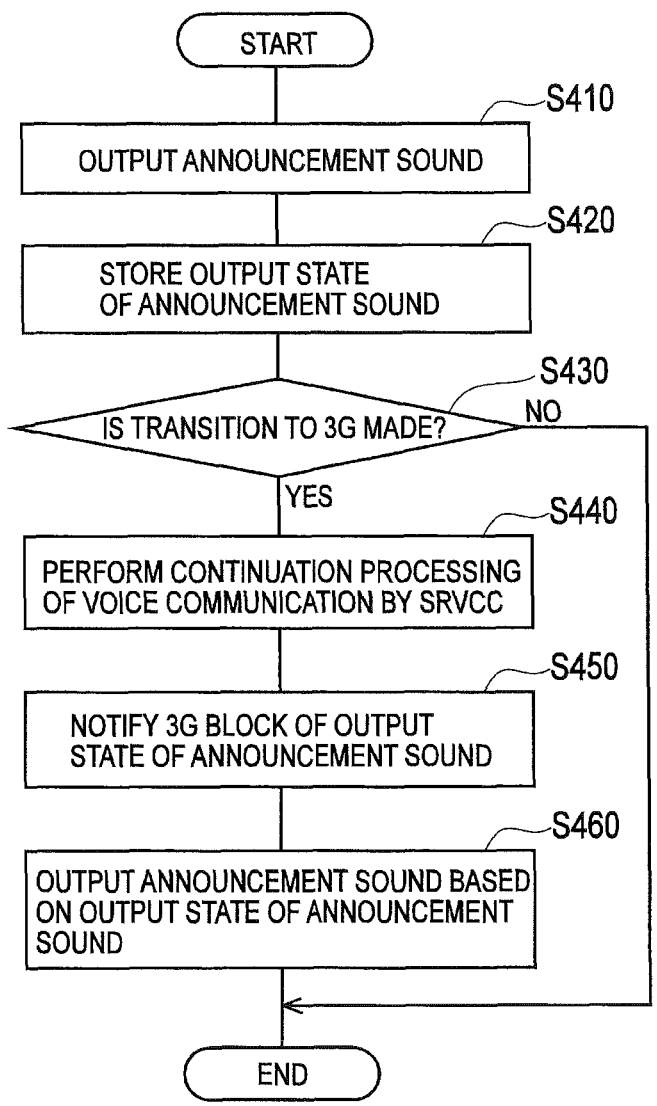
FIG. 5 is a flowchart showing an operation of outputting an announcement sound during transition of the UE 100A from LTE to 3G according to the embodiment of the present invention.

FIG. 5 shows an operation flow of the mobile station (UE 100A). Specifically, FIG. 5 shows an operation flow of outputting the announcement sound during transition of the UE 100A from LTE to 3G.

As shown in FIG. 5, the UE 100A receives the announcement sound from the network upon transmission of the call request to the call-terminating terminal (UE 100B), and outputs the received announcement sound (S410). Also, the UE 100A stores the output state of the announcement sound (S420). To be more specific, the UE 100A stores the output of the announcement sound after the transmission of the call request to the call-terminating terminal via LTE.

Next, the UE 100A determines whether or not a transition is made from LTE to 3G during a period when such an announcement sound is being outputted (S430).

When the transition is made from LTE to 3G, the UE 100A executes the continuation processing of the voice communication by SRVCC (specifically, continuation processing before alerting) as described above (S440). Also, the UE 100A notifies the output state of the announcement sound stored in Step S420 from the LTE side to the 3G side (S450). To be more specific, the output state is notified from the LTE block to the 3G block in the UE 100A.

The UE 100A (the 3G block) outputs the announcement sound based on the notified output state of the announcement sound (S460).

(4) Advantageous Effects

According to the UE 100A (UE 100B), if the continuation processing of the voice communication service (SRVCC) is executed during a period when the announcement sound is being outputted, more specifically, if SRVCC is executed before alerting the UE 100B (in a state where no SIP "180 Ringing" or "200 OK" is received) after transmitting a UE 100B call request (SIP INVITE) to the IMS 300, the announcement sound is outputted even after the transition to 3G. In other words, the output of the announcement sound can be continued even if the transition is made from LTE to 3G by SRVCC when the announcement sound is being received from the network side in response to the call request to the call-terminating terminal.

Thus, even if the transition is made from LTE to 3G during the output of the announcement sound by the UE 100A, a situation can be avoided where the announcement sound that is being outputted suddenly falls off into silence, thus giving no sense of discomfort to the user.

(5) Other Embodiment

As described above, the details of the present invention have been disclosed by using the embodiments of the present invention. However, it should not be understood that the description and drawings which constitute part of this disclosure limit the present invention. From this disclosure, various alternative embodiments, examples, and operation techniques will be easily found by those skilled in the art.

For example, in the above embodiment of the present invention, the description is given of the example where the voice data based on Early Media is used as the announcement sound. However, the announcement sound is not limited to the voice data and does not necessarily have to be voices as long as the announcement sound is based on the data transmitted from the network.

Moreover, in the above embodiment, the description is given of LTE and 3G as an example. However, the present invention is not limited to LTE or 3G as long as the voice communication service can be provided via the IP multimedia subsystem and a transition can be made between a first radio access system with no circuit-switched domain and a second radio access system with a circuit-switched domain.

The features of the present invention may also be expressed as follows. A first feature of the present invention is summarized as a UE 100A/100B (mobile station) capable of providing a voice communication service via IMS 300 (IP multimedia subsystem) and configured to execute a transition from LTE (first radio access system) with no circuit-switched domain to 3G (second radio access system) with a circuit-switched domain, including: a voice communication control unit 103 (voice communication control unit) configured to execute SRVCC (continuation processing of the voice communication service in the second radio access system) if the mobile station makes a transition of a connection destination from the first radio access system to the second radio access system; and an announcement control unit 105 (announcement control unit) configured to receive an announcement sound via the first radio access system or the second radio access system, and output the announcement sound after requesting alerting of the other party and before starting the alerting of the other party. Here, the announcement control unit outputs the announcement sound even after a transition to the second radio access system is made if the voice communication control unit executes the continuation processing of the voice communication service during a period when the announcement sound is being outputted.

In the first feature of the present invention, the mobile station may comprise an output state retention unit 107 (output state retention unit) configured to retain an output state indicating whether or not the announcement sound is being outputted. Here, the announcement control unit may output the announcement sound based on the output state retained by the output state retention unit if the voice communication control unit executes the continuation processing of the voice communication service.

A second feature of the present invention is summarized as a mobile communication method for executing a transition of a mobile station from a first radio access system with no circuit-switched domain to a second radio access system with a circuit-switched domain, the method being capable of providing a voice communication service via an IP multimedia subsystem, including the steps of: executing continuation processing of the voice communication service in the second radio access system if the mobile station makes a transition of a connection destination from the first radio access system to the second radio access system; and receiving an announcement sound via the first radio access system or the second radio access system, and outputting the announcement sound after requesting alerting of the other party and before starting the alerting of the other party. Here, the announcement sound outputting step includes outputting the announcement sound even after a transition to the second radio access system is made if the continuation processing of the voice communication service is executed during a period when the announcement sound is being outputted.

As described above, the present invention naturally includes various embodiments which are not described herein. Accordingly, the technical scope of the invention should be determined only by the matters to define the invention in the scope of claims regarded as appropriate based on the description.

Note that the entire content of Japanese Patent Application No. 2012-197019 (filed on Sep. 7, 2012) is incorporated by reference in the present specification.

INDUSTRIAL APPLICABILITY

According to the feature of the present invention, a mobile station and a mobile communication method can be provided, which are capable of continuing output of an announcement sound even if a transition is made from LTE to 3G by SRVCC when the announcement sound is being received from a network side in response to a call request to a call-terminating terminal.

EXPLANATION OF THE REFERENCE NUMERALS 10 mobile communication system
100A, 100B UE
101 transition processing unit
103 voice communication control unit
105 announcement control unit
107 output state retention unit
109 signal output unit
200 IP-CAN
300 IMS
310 P-CSCF
320 S-CSCF
330 MRF

The invention claimed is:

1. A mobile station capable of providing a voice communication service via an IP multimedia subsystem and configured to execute a transition from a first radio access system with no circuit-switched domain to a second radio access system with a circuit-switched domain, comprising:
a voice communication control circuit configured to execute continuation processing of the voice communication service in the second radio access system if the mobile station makes a transition of a connection destination from the first radio access system to the second radio access system; and
an announcement control circuit configured to receive an announcement sound via the first radio access system or the second radio access system, and output the announcement sound after requesting an alerting of an other party and before starting the alerting of the other party,
wherein the announcement control circuit outputs the announcement sound even after a transition to the second radio access system is made if the voice communication control circuit executes the continuation processing of the voice communication service during a period when the announcement sound is being outputted.

2. The mobile station according to claim 1, further comprising:
an output state retention circuit configured to retain an output state indicating whether or not the announcement sound is being outputted,
wherein the announcement control circuit outputs the announcement sound based on the output state retained by the output state retention circuit if the voice communication control circuit executes the continuation processing of the voice communication service.

3. A mobile communication method for executing a transition of a mobile station from a first radio access system with no circuit-switched domain to a second radio access system with a circuit-switched domain, the method being capable of providing a voice communication service via an IP multimedia subsystem, comprising the steps of:
executing continuation processing of the voice communication service in the second radio access system if the mobile station makes a transition of a connection destination from the first radio access system to the second radio access system; and
receiving an announcement sound via the first radio access system or the second radio access system, and outputting the announcement sound after requesting an alerting of an other party and before starting the alerting of the other party,
wherein the announcement sound outputting step includes outputting the announcement sound even after a transition to the second radio access system is made if the continuation processing of the voice communication service is executed during a period when the announcement sound is being outputted.

* * * * *